(12) United States Patent
Osbourn et al.

(10) Patent No.: US 8,201,099 B1
(45) Date of Patent: Jun. 12, 2012

(54) METHOD AND SYSTEM FOR RENDERING AND INTERACTING WITH AN ADAPTABLE COMPUTING ENVIRONMENT

(75) Inventors: Gordon Cecil Osbourn, Albuquerque, NM (US); Ann Marie Bouchard, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 1015 days.

(21) Appl. No.: 11/527,002

(22) Filed: Sep. 26, 2006

(51) Int. Cl.
*G06F 3/00* (2006.01)

(52) U.S. Cl. ........ 715/778; 715/706; 715/713; 715/757; 715/771; 715/775

(58) Field of Classification Search .................. 571/706, 571/713, 757, 771, 775, 778; 715/706, 713, 715/757, 771, 775, 778, 762
See application file for complete search history.

(56) References Cited

U.S. PATENT DOCUMENTS

| | | | |
|---|---|---|---|
| 6,513,132 B1 * | 1/2003 | Suzuki | 714/38 |
| 6,629,065 B1 * | 9/2003 | Gadh et al. | 703/1 |
| 6,836,878 B1 * | 12/2004 | Cuomo et al. | 717/100 |
| 6,957,415 B1 | 10/2005 | Bouchard et al. | |
| 7,330,176 B2 * | 2/2008 | Liang et al. | 345/156 |
| 2003/0043144 A1 * | 3/2003 | Pundarika et al. | 345/419 |
| 2006/0184540 A1 * | 8/2006 | Kung et al. | 707/10 |
| 2007/0277115 A1 * | 11/2007 | Glinsky et al. | 715/771 |

OTHER PUBLICATIONS

Osbourn, Gordon C. et al., "Dynamic Self-Assembly of Hierarchical Software Structures/Systems", Sandia National Laboratories, Mar. 2003.
Bouchard, Ann M. et al., "Dynamic Self-Assembly and Computation: From Biological to Information Systems", Sandia National Laboratories, Physical and Chemical Sciences Center, Jan. 2004.

\* cited by examiner

*Primary Examiner* — William Bashore
*Assistant Examiner* — Mylinh Tran
(74) *Attorney, Agent, or Firm* — Blakely Sokoloff Taylor & Zafman; Cory G. Claasen; Kevin W. Bieg

(57) ABSTRACT

An adaptable computing environment is implemented with software entities termed "s-machines", which self-assemble into hierarchical data structures capable of rendering and interacting with the computing environment. A hierarchical data structure includes a first hierarchical s-machine bound to a second hierarchical s-machine. The first hierarchical s-machine is associated with a first layer of a rendering region on a display screen and the second hierarchical s-machine is associated with a second layer of the rendering region overlaying at least a portion of the first layer. A screen element s-machine is linked to the first hierarchical s-machine. The screen element s-machine manages data associated with a screen element rendered to the display screen within the rendering region at the first layer.

26 Claims, 12 Drawing Sheets

METHOD AND SYSTEM FOR RENDERING AND INTERACTING WITH AN ADAPTABLE COMPUTING ENVIRONMENT

This invention was made with Government support under Contract No. DE-AC04-94AL85000 between Sandia Corporation and the U.S. Department of Energy. The U.S. Government has certain rights in this invention.

TECHNICAL FIELD

This disclosure relates generally to software, and in particular but not exclusively, relates to computing environments.

BACKGROUND INFORMATION

Many hierarchical software systems are designed level-by-level using object-oriented designs that define the classes of objects of an application and their interrelationships. Associated with each class is a set of operations that can be performed on its objects, plus the set of object attributes. In the object-oriented design approach, code and data that belong together can be combined into objects. The objects are interconnected with each other within a level and to other levels. The objects are treated essentially as black-box modules that are utilized in various configurations to perform higher-level functions. The object-oriented designs can be used to form complex domains with layers or modules that can be interchangeable. Software architecture systems of enormous complexity can thus be formed. However, like most software systems, the object modules are actuated by direct calls from other modules and perform only designated and non-changeable functions. Data pathways between objects are predefined at compile time and immutable thereafter, unless the source code is modified and recompiled.

Due to the rigid nature of conventional object-oriented programming ("OOP"), the users of software products created using conventional OOP techniques cannot easily modify the underlying software and data pathways. Rather, if a group of users all have a common need, they often must lobby the publisher for their desired feature, and wait for the next software product installment before a new feature addressing the need is incorporated by the publisher.

Microsoft Windows Operating System ("OS"), Microsoft Office, Apple OS, and Linux OS are examples of computing environments that are fixed at compile time and relatively immutable by the user at runtime. Microsoft Windows OS and Apple OS both use graphical user interfaces ("GUIs") that are fixed at compile time and therefore generally immutable by the user (notwithstanding user defined configuration selections).

Although both these software products rely extensively on GUIs, they still require a relatively tech-savvy user who understands hierarchical file structures to access, modify, create, and delete user files and data. For users that are unfamiliar with hierarchical file structures, using these software packages can be frustrating and intimidating. On the other hand, for advanced tech-savvy users, the inability to modify these software packages after compile time can also be frustrating.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method to implement a user-adaptable computing environment are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
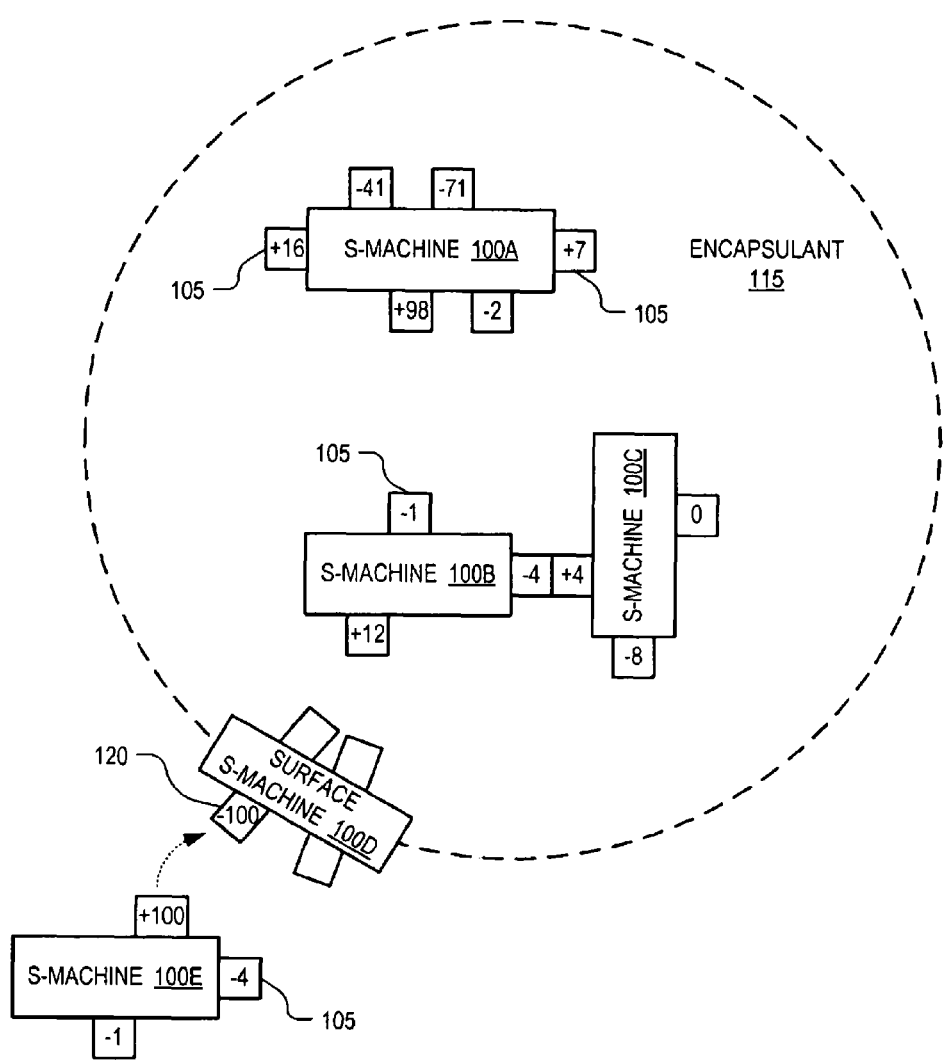
FIG. 1 is a block diagram illustrating self-assembling s-machines grouped in encapsulated environment, in accordance with an embodiment of the invention.

FIG. 1 is a block diagram illustrating a software virtual environment including software entities termed "software-machines" or "s-machines" 100A-100E (collectively s-machines 100), in accordance with an embodiment of the invention. Each s-machine 100 is capable of executing a task, which can be simple (such as adding two numbers) or complex (such as reading a complex formatted file from the hard disk). Each s-machine 100 includes one or more of a data storage element to store data, an actuating element to execute commands, or a control element to control activation of the s-machine in response to a stimulus.

S-machines 100 are capable of self-assembling or self-organizing by binding or linking to each other to form a larger s-machine complex capable of executing higher level complex tasks. For example, multiple s-machines 100 may be created, one capable of summing two operands, one capable of subtracting one operand from another, one capable of multiplying two operands, and yet another capable of dividing one operand into another operand. The s-machines capable of implementing these simple mathematical functions may then bind together with one or more other s-machines capable of generating a graphical user interface ("GUI"). By self-organizing into a more complex structure, these simple s-machines can create a graphical calculator. Since self-organizing is executed during runtime, additional s-machines capable of other mathematical functions can be created and joined with the existing s-machines of the calculator group to extend the functionality of the calculator during runtime, after compile time. In this manner, s-machines 100 are capable of generating a real-time, user-adaptable, computing environment.

S-machines 100 self-assemble using binding sites 105 (only a portion are labeled so as not to clutter the drawing). Each s-machine 100 may include one or more binding sites 105 that can remain concealed pending the occurrence of prerequisite conditions, at which time the concealed binding site exposes itself to other s-machines 100. In some cases, the act of binding itself is the prerequisite or stimulus for exposing another concealed binding site. Each binding site 105 is associated with a key and can stochastically or deterministically bind to another exposed binding site on a different s-machine 100 having a complementary key. S-machines 100 make and break bonds formed between complementary binding sites 105 in due course during runtime. In one embodiment, when binding sites of two s-machines 100 are bound, the two sites have pointers pointing to each other. This provides a data pathway between the two s-machines, enabling the s-machines to access each other's data, pass data to each other, or send commands to each other. These bonds may be short-lived or long-lived. The act of bind/unbinding may be the stimulus to cause one or more internal actuation elements of an s-machine 100 to execute. A signal (whether data-passing or not) sent from one s-machine to a bound s-machine may also be the stimulus to cause internal actuation elements of one or both s-machines 100 to execute. In other cases, other stimulus may cause an s-machine 100 to execute its actuation element(s).

S-machines 100 can self-organize into hierarchical data structures having limited scope. For example, surface s-machine 100D may function as an interface to encapsulant 115 to limit the scope of s-machines 100A-100C contained within encapsulant 115. Encapsulant 115 acts as a sort of virtual environment of limited scope where s-machines 100 within this virtual environment form some application, function, or process.

Surface s-machine 100D can operate as a sort of gate keeper allowing s-machines to enter or exit encapsulant 115. In this role, surface s-machine 100D has a key associated with a binding site 120 and any s-machine 100 wishing to pass through the virtual encapsulant surface must have a complementary key. Alternatively, surface s-machine 100D can operate as a signal transducer across the encapsulant surface. In that role, when an external s-machine having a complementary key binds to binding site 120, this stimulates surface s-machine 100D to expose a site internal to the encapsulant, which can trigger the execution of some internal task by binding to a control site of an internal machine. Encapsulant 115 effectively creates a local environment in which collections of free binding sites 105 can interact without interference from the outside world. S-machines 100 encapsulated within encapsulant 115 can reuse binding keys already in use by other s-machines outside of encapsulant 115 without establishing bonds thereto.

In one embodiment, the virtual environment created by s-machines 100 and encapsulant 115 is a biologically inspired software architecture. S-machines 100 are analogous to proteins, which operate as molecular machines. S-machines 100 self-assemble via binding/unbinding events in a dynamic manner similar to continually reconfiguring proteins. As mentioned, the bonds between s-machines 100 can be long lived, analogous to strong covalent bonds, or fleeting, analogous to weak protein-protein bonds. Encapsulant 115 resembles a biological cell membrane that isolates its internal contents from bonding interactions with external structures. Surface s-machine 100D, itself, is analogous to membrane proteins in biological cells. Some surface s-machines, termed "gates", correspond to channel proteins, allowing passage of other entities (s-machines or encapsulants) into or out of the encapsulant. Other surface s-machines may correspond to signal or receptor proteins capable of communicating signals without transporting any s-machines into or out of an encapsulant.

Figure 2:
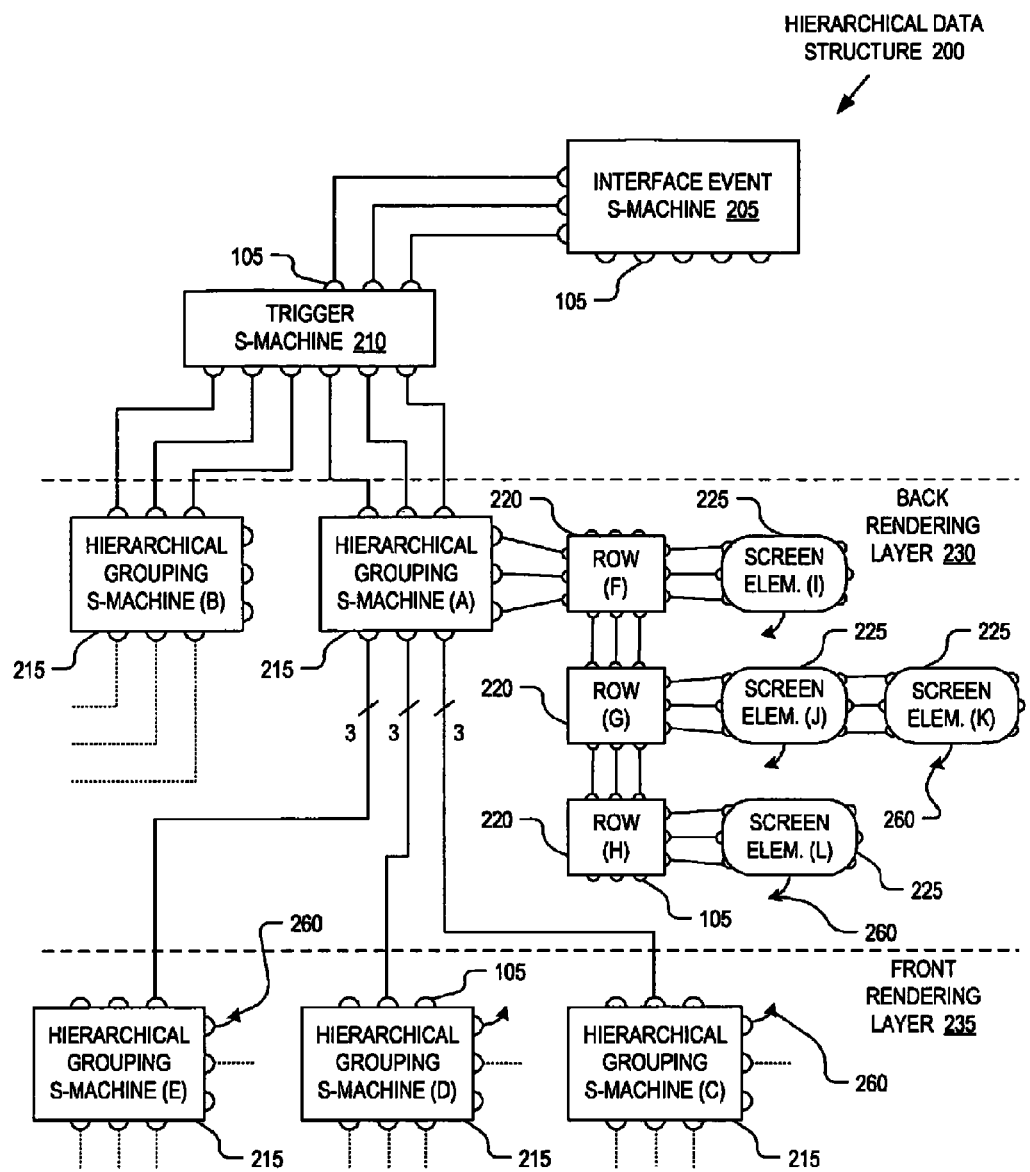
FIG. 2 is a block diagram illustrating a hierarchical data structure for controlling and rendering images to a display screen, in accordance with an embodiment of the invention.

FIG. 2 is a block diagram illustrating a hierarchical data structure 200 including s-machines for rendering and interacting with screen elements, in accordance with an embodiment of the invention. The illustrated embodiment of hierarchical data structure 200 includes an interface event s-machine 205, a trigger s-machine 210, hierarchical grouping s-machines 215, row rendering s-machines 220, and screen element s-machines 225. The s-machines dynamically self-organize into hierarchical data structure 200 by matching complementary binding keys associated with their binding sites 105 (only a portion are labeled), as discussed above.

Figure 3:
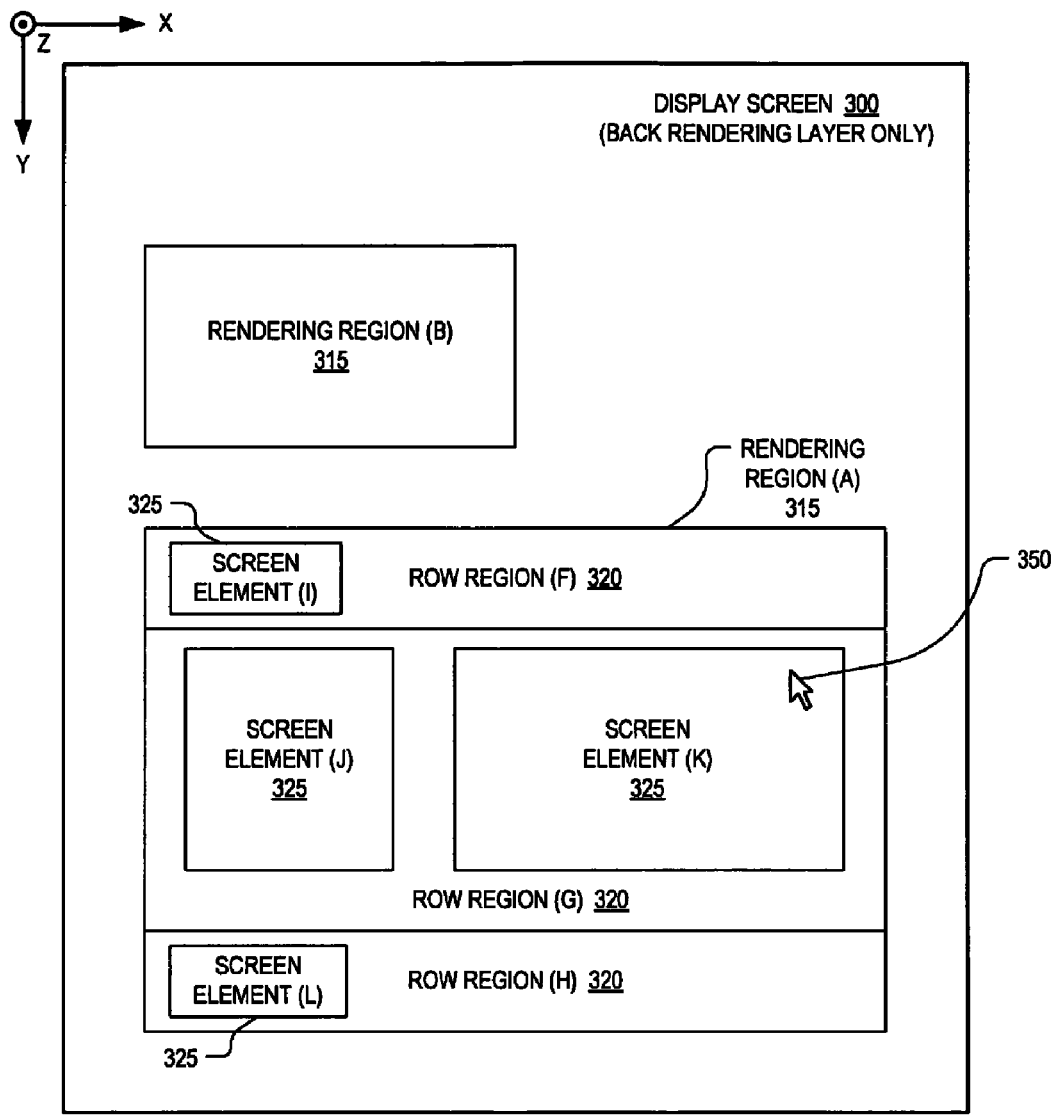
FIG. 3 is a block diagram illustrating a display screen with multiple rendering regions, row regions, and screen elements, in accordance with an embodiment of the invention.

FIG. 3 illustrates an example display screen 300 including screen elements rendered by hierarchical data structure 200. FIG. 3 only illustrates a single rendering layer, corresponding to a back rendering layer, while multiple front rendering layers (not illustrated) may be rendered directly in front of, and therefore partially conceal, the back rendering layer.

Each hierarchical grouping s-machine 215 is associated with a corresponding rendering region 315 (e.g., hierarchical grouping s-machine (A)->rendering region (A), hierarchical grouping s-machine (B)->rendering region (B), etc.). Each row rendering s-machine 220 is associated with a corresponding row region 320 (e.g., row rendering s-machine (F)->row region (F), row rendering s-machine (G)->row region (G), etc.). Similarly, each screen element s-machine 225 is associated with a corresponding screen element 325 (e.g., screen element s-machine (J)->screen element (J), screen element s-machine (L)->screen element (L), etc.).

Hierarchical grouping s-machines 215, row rendering s-machines 220, and screen element s-machines 225 are organized into a hierarchy where vertically bound hierarchical grouping s-machines 215 connote successive rendering layers. Since hierarchical grouping s-machines (A) and (B) are both bound within hierarchical data structure 200 at the same rendering layer (i.e., back rendering layer 230), they group row rendering s-machines 220 and screen element s-machines 225 responsible for rendering screen elements 325 on the same rendering layer. In contrast, hierarchical grouping s-machines (C), (D), and (E) are bound below hierarchical grouping s-machine (A), and therefore group row rendering s-machines and screen element s-machines responsible for rendering screen elements at a front rendering layer 235 that is in front of or overlays back rendering layer 230 (i.e., front rendering layer 235 has a greater value in the z-axis than back rendering layer 230, see FIG. 3). Furthermore, since hierarchical grouping s-machines (C), (D), and (E) are all bound below hierarchical grouping s-machine (A), these s-machines will correspond to rendering regions that have the same or smaller x-y dimensions as rendering region (A) of hierarchical grouping s-machine (A), but will be bounded by the x-y coordinates of rendering region (A), and therefore reside in front of at least a portion of rendering region (A).

In one embodiment, screen element s-machines 225 include data or pointers to data for generating each screen element 325 rendered to display screen 300. For example, screen element s-machines 225 may provide the data used to render an image, text, blank region, or any other object to display screen 300.

One or more screen element s-machines 225 may link in series from a single row rendering s-machine 220. In one embodiment, row rendering s-machines 220 include functionality for rendering each screen element 325 included within its associated row region 320 to display screen 300 with reference to data provided by the corresponding screen element s-machine 225. It should be appreciated that in other embodiments, the functionality for rendering screen elements 325 may be embedded within screen element s-machines 225 themselves or hierarchical grouping s-machines 215.

In one embodiment, interface event s-machine 205 includes functionality for tracking the movement of a screen pointer 350 (see FIG. 3) and may include knowledge of the x-y coordinates of screen pointer 350, the relative motion of screen pointer 350 from one spot on display screen 300 to another, the velocity of screen pointer 350, or otherwise. Interface event s-machine 205 may further poll external input/output ("I/O") devices (e.g., key board, mouse, etc.) for events associated with the current location of screen pointer 350 (e.g., key strokes, scroll wheel movement, mouse clicks, etc.).

Trigger s-machine 210 is bound between interface event s-machine 205 and hierarchical grouping s-machines at the back rendering layer (e.g., hierarchical grouping s-machines (A) and (B) at back rendering layer 230). In one embodiment, trigger s-machine 210 receives the current x-y coordinates of screen pointer 350 and sends a signal with the x-y coordinates to the hierarchical grouping s-machines (A) and (B). Hierarchical grouping s-machines (A) and (B) determine whether screen pointer 350 currently resides over any portion of their corresponding rendering region 315. If it does, hierarchical grouping s-machines 215 will pass this signal on to successive hierarchical grouping s-machines bound below. In FIG. 2, if hierarchical grouping s-machine (A) determined that the screen pointer 350 resides over its rendering region, it would pass the x-y coordinate signal to hierarchical grouping s-machines (C), (D), and (E). The lowest hierarchical grouping s-machine in the hierarchy (corresponding to the front-most rendering layer) that determines that the screen pointer 350 resides over its rendering region will also forward the x-y coordinate signal on to its attached row rendering s-machines 220 and screen element s-machines 225 to determine over which screen element 325 screen pointer 350 currently resides. When a particular screen element s-machine 225 determines that screen pointer 350 currently resides over its corresponding screen element 325, the particular screen element s-machine 225 becomes the "owner" of the screen pointer 350. The screen element s-machine 225 that owns the screen pointer 350 will expose new binding sites 105 to establish new event pathways (discussed in greater detail below in connection with FIGS. 4 and 5). It should be appreciated that in other embodiments, the functionality for determining which screen element s-machine 225 owns the screen pointer 350 may be embedded within the row rendering s-machines 220 or the hierarchical grouping s-machines 215.

Trigger s-machine 210 may further be capable of issuing render signals to the lower hierarchy of hierarchical data structure 200 to signal each s-machine to re-execute its rendering instructions (e.g., OpenGL commands, DirectX commands, or the like). Trigger s-machine 210 may further be capable of signaling the lower hierarchy that display screen 300 has changed (e.g., user dragged a screen element to a new screen location) and that each s-machine should update itself and render accordingly. Although FIG. 2 illustrates three bonds between each s-machine within hierarchical data structure 200 (one for each of the rendering, screen pointer x-y coordinate, and update signals) it should be appreciated that more or less such bonds may be established between the s-machines.

The illustrated embodiment of hierarchical data structure 200 further illustrates bonds 260 for establishing communication pathways between screen element s-machines 225 and hierarchical grouping s-machines 215. For example, a particular screen element s-machine 225 may establish a bond 260 with one or more hierarchical grouping s-machines 215 that correspond to rendering regions 315 that reside directly in front of, at the next rendering layer forward, the corresponding screen element 325 of the particular screen element s-machine 225. Bonds 260 enable the back rendering layer screen element s-machines 225 to signal the bound-to hierarchical grouping s-machines 215 (which render the next rendering layer forward) to detach from hierarchical data structure 200. Upper rendering layer hierarchical grouping s-machines 215 may detach from hierarchical data structure 200 so that other hierarchical grouping s-machines 215 can attach to change the image rendered to display screen 300. The attachment and detachment of hierarchical grouping s-machines 215 is discussed in further detail below in connection with FIGS. 10, 11, and 12.

Figure 4:
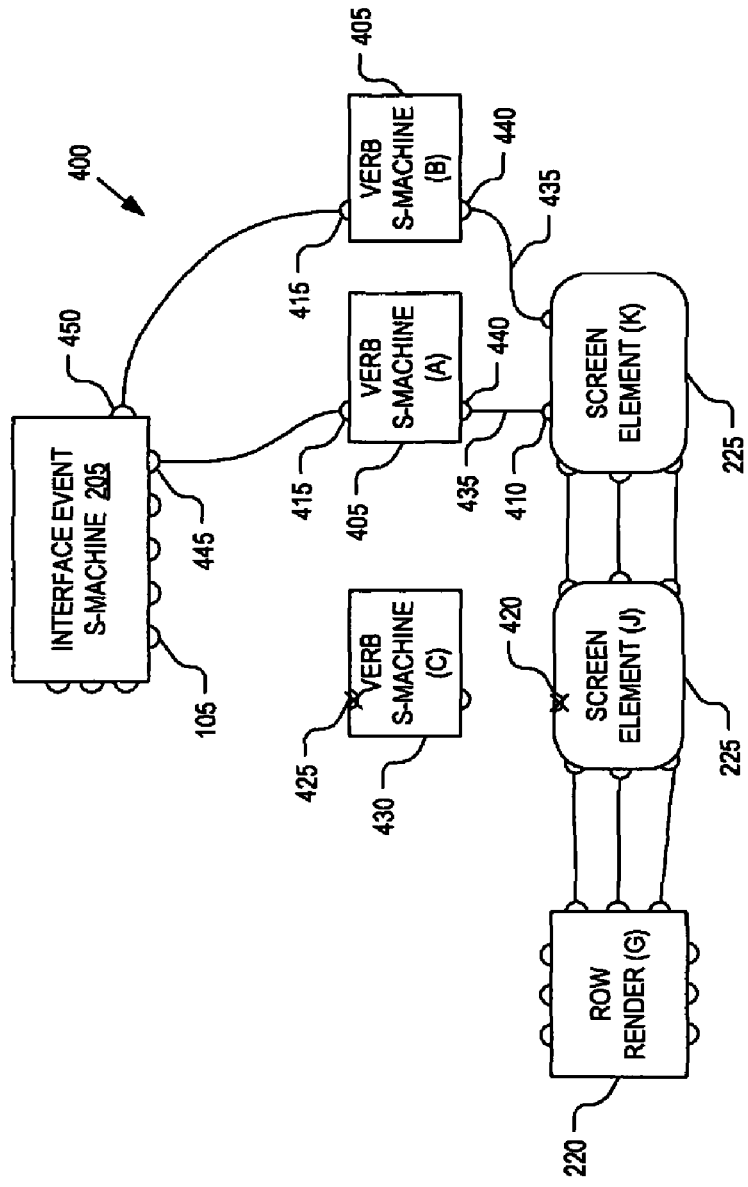
FIG. 4 is a block diagram illustrating self-assembly of an event pathway between an interface event s-machine, a verb s-machine, and a screen element s-machine, in accordance with an embodiment of the invention.

FIG. 4 is a block diagram illustrating self-assembly of an event pathway 400, in accordance with an embodiment of the invention. Event pathway 400 links interface event s-machine 205 to screen element (K) via a verb s-machine 405. Event pathway 400 is created in real-time in response to a specific event or set of events. Verb s-machine 405 is a special type of s-machine 100 that binds to other s-machines 100 to implement functions and take "actions" associated with the bound-to s-machine 100. In the present example, verb s-machines bind to screen element s-machines 225 to execute actions associated with their corresponding screen elements 325.

For example, event pathway 400 may be created in response to passing screen pointer 350 over screen element (K). For the sake of discussion, if screen element (K) is a text area rendered to display screen 300, then positioning screen pointer 350 over screen element (K) and left "clicking" a mouse button may insert a cursor within the text, putting the text area into edit mode. Additionally, positioning screen pointer 350 over screen element (K) and then pressing the left mouse button down and dragging may select and highlight text. The functionality of initiating text editing and selecting text may be implemented by verb s-machines 405, as described below.

Figure 5:
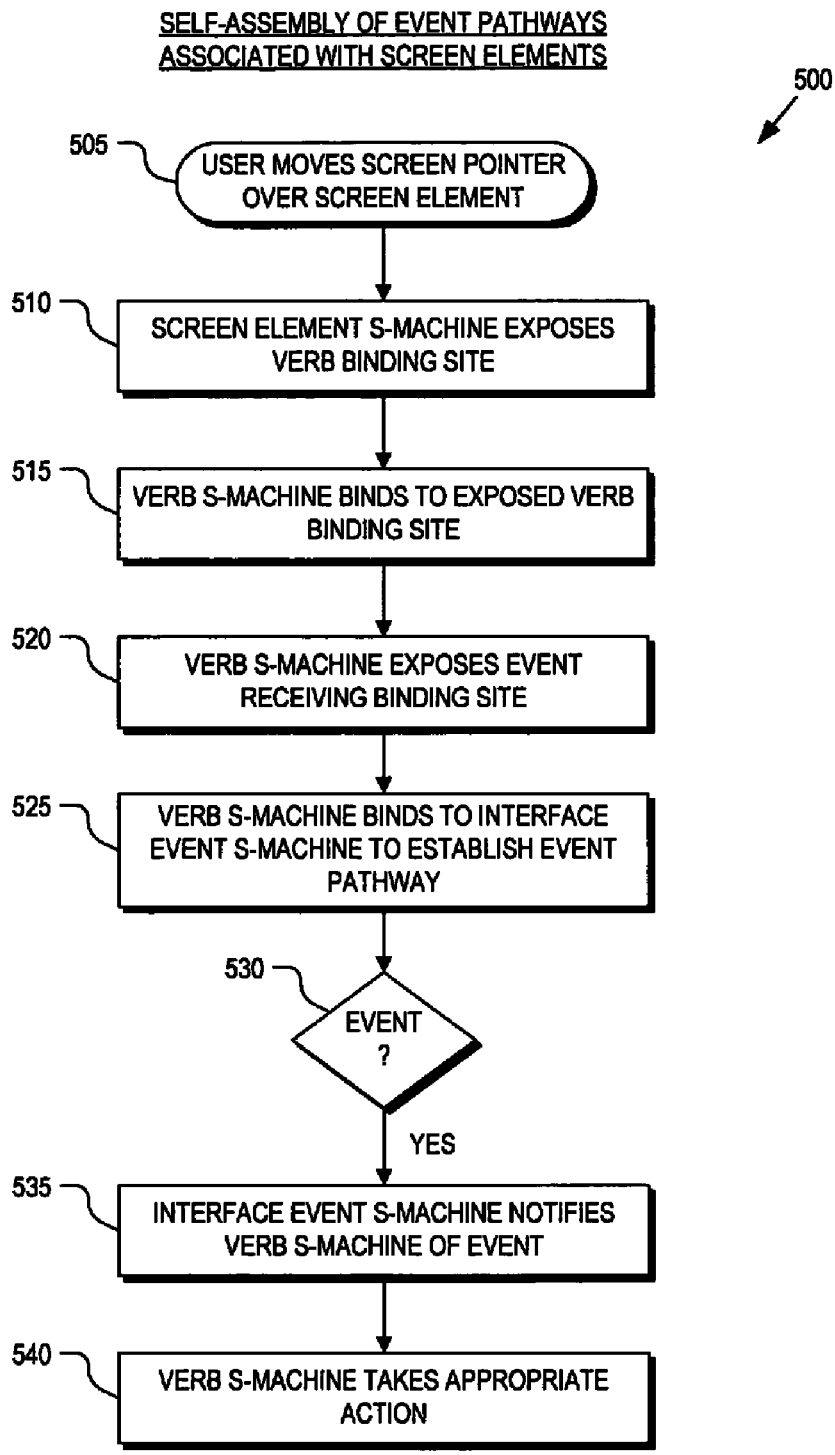
FIG. 5 is a flow chart illustrating a process to self-assemble event pathways associated with screen elements to implement various functionality associated with the screen elements, in accordance with an embodiment of the invention.

FIG. 5 is a flow chart illustrating a process 500 to self-assemble event pathway 400 associated with screen element (K) to implement various functionalities associated with screen element (K), in accordance with an embodiment of the invention. The order in which some or all of the process blocks appear below should not be deemed limiting. Rather, one of ordinary skill in the art having the benefit of the present disclosure will understand that some of the process blocks may be executed in a variety of orders not illustrated.

In a process block 505, a user moves screen pointer 350 over screen element (K). In a process block 510, screen element s-machine (K) exposes one or more verb binding sites 410 in response to screen pointer 350. In one embodiment, screen element s-machine (K) exposes verb binding site 410 in response to a signal issued by trigger s-machine 210, and propagated by hierarchical grouping s-machines 215, as to which screen element s-machine 225 owns screen pointer 350. Since in the illustrated embodiment of FIG. 3, screen pointer 350 is residing over screen element (K), screen element s-machine (K) responds by exposing one or more verb binding sites 410. Since the text area represented by screen element s-machine (K) can respond to left-mouse-click events (initiating text editing) and left-mouse-down-and-drag events (selecting text), screen element s-machine (K) will expose two verb binding sites 410, with binding site keys complementary to the binding site keys 440 of two different verb s-machines (A) and (B). Verb s-machine (A) embeds the functionality of responding to left-mouse-click events by initiating text editing. Verb s-machine (B) embeds the functionality of responding to left-mouse-down-and-drag events by selecting text.

In a process block 515, verb s-machines 405 (A) and (B) bind to exposed verb binding sites 410 to create temporary bonds 435 that last as long as the user maintains screen pointer 350 over screen element (K). In a process block 520, verb s-machines 405 that are bound to screen element s-machine (K) expose an event receiving binding site 415. Event receiving binding site 415 is exposed in response to verb s-machine 405 binding to screen element s-machine (K). The key of binding site 415 of verb s-machine (A) is complementary to that of the binding site 445 of interface event s-machine 205 associated with left-mouse-click events. The key of binding site 415 of verb s-machine (B) is complementary to that of the binding site 450 of interface event s-machine 205 associated with left-mouse-down-and-drag events. Upon exposing event receiving binding site 415, verb s-machines (A) and (B) 405 bind to interface event s-machine 205 (process block 525). At this point, one or more event pathways 400 are established and ready to service events associated with screen element (K). In this example, two event pathways 400 are established, one associated with left-mouse-click events and one associated with left-mouse-down-and-drag events.

Interface event s-machine 205 may be constantly polling for a variety of different types of events, such as a left mouse click, left-mouse-down-and-drag, a key stroke, a scroll wheel action, or otherwise. Interface event s-machine 205 may have a binding site 105 associated with each such event type, each with a different key. In a decision block 530, if an event of a type associated with a bound binding site 105 of interface event s-machine 205 occurs, then the event is valid, and the process 500 continues to a process block 535. If an event occurs for which interface event s-machine 205 has no bound event pathway, the event is invalid and no action is taken.

Upon the occurrence of a valid event (decision block 530), interface event s-machine 205 sends a signal through the binding site 105 associated with the event type. This signals the appropriate verb s-machine 405 of the event occurrence along event pathway 400 (process block 535). Finally, in a process block 540, the signaled verb s-machine 405 takes the appropriate action in response to the specific event. For example, if the interface event was a left mouse click, verb s-machine (A) 405 would be signaled, and respond by rendering a cursor in the x-y location of the screen pointer and putting the text in editing mode. It should be appreciated that embodiments of verb s-machines 405 are not limited to binding to screen element s-machines 225 for initiating text editing or selecting text, but rather may bind to a row rendering s-machines 220 or hierarchical grouping s-machines 215 to implement a variety of actions in response to a variety of events.

Returning to FIGS. 3 and 4, screen pointer 350 is not currently residing over a screen element (J) 325. Therefore, verb binding site 420 of screen element s-machine (J) 225 is internally hidden. Correspondingly, event receiving binding site 425 of verb s-machine 430 is also hidden, since verb s-machine 430 is not currently bound to any screen element s-machine. For the sake of discussion, suppose screen element (J) 325 corresponds to a button, and verb s-machine (C) 430 responds to left-mouse-click events by displaying an image. If the screen pointer 350 were moved over screen element (J) 325, the bonds between interface event s-machine 205, verb s-machines (A) and (B) 405, and screen element s-machine (K) 225 would all be broken, to be replaced by bonds between screen element s-machine (J) 225, verb s-machine (C) 430, and interface event s-machine 205 in the same manner as described above. Since verb s-machine (C) 430 responds to left-mouse-click events, it would bind to the very same binding site 445 of interface event s-machine 205 that had previously been bound to verb s-machine (A) 405. Thus, many verb s-machines, all responding to the same event type, can bind, one at a time, to the same binding site on interface event s-machine 205. Further, verb s-machines serve as a means of specializing the response to a generic interface event (such as left-mouse-click) to the context of the screen element s-machine to which it is bound. It should be appreciated that in other embodiments, the functionality of specializing the response to generic interface events may be embedded in the screen element s-machines 225 themselves, rather than separate verb s-machines.

Figure 6:
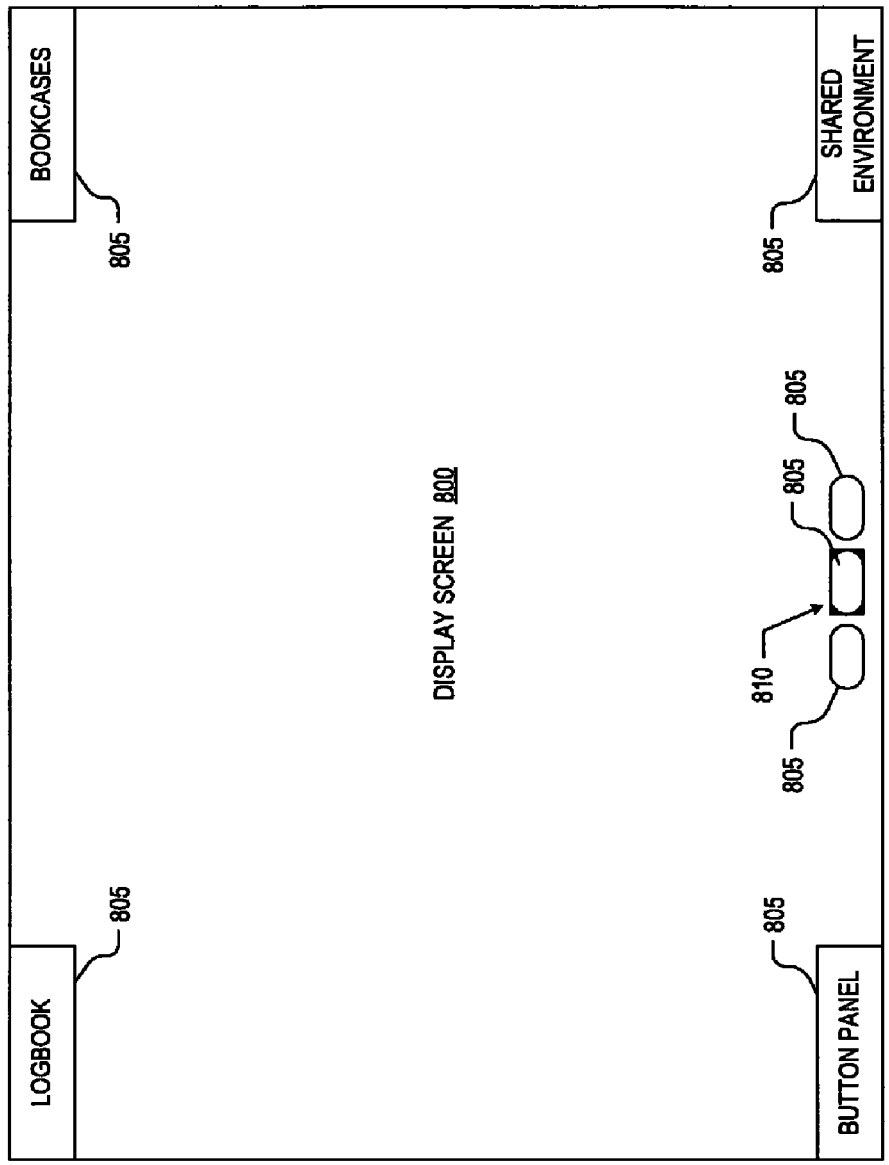
FIG. 6 is a block diagram illustrating a rendered display screen including access elements, in accordance with an embodiment of the invention.

FIG. 6 is a block diagram illustrating a display screen 800 including access elements 805, in accordance with an embodiment of the invention. Access elements 805 are a type of screen element 325 rendered to provide visual access to associated functions. The bookcase access element accesses one or more bookcases having bookshelves holding virtual books for creating, storing, accessing, and modifying data. The logbook access element accesses a logbook enabling a user to view a record of past events and even undo past events. The button panel access element accesses function-specific buttons (e.g., a calculator). The shared environment access element accesses a shared environment, which enables a variety of users to remotely collaborate. Finally, the screen access elements enable a user to switch between multiple independent virtual desktops. A visual cue as to which virtual desktop is currently displayed may be provided by visual cue 810.

In one embodiment, display screen 800 is rendered using a hierarchical data structure similar to hierarchical data structure 200. Each access element 805 may be associated with a screen element 225. When a user positions a screen pointer over one of the access elements 805, a verb s-machine establishes an event pathway (see process 500). Upon clicking on a particular access element 805, the verb s-machine can take the appropriate action to access the corresponding function, which is subsequently rendered to display screen 800.

Figure 7:
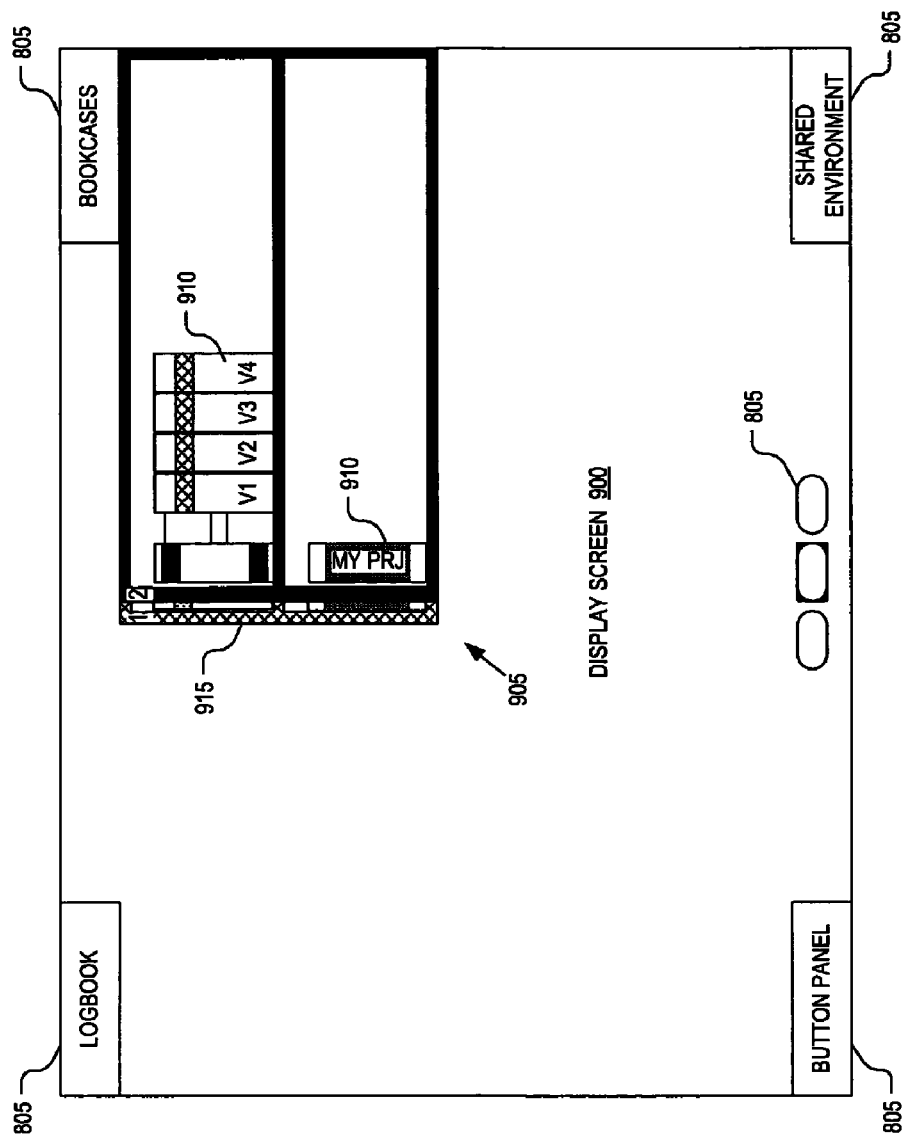
FIG. 7 is a block diagram illustrating a rendered display screen including a bookcase for storing, organizing, and retrieving virtual books, in accordance with an embodiment of the invention.

FIG. 7 is a block diagram illustrating a display screen 900 including a virtual bookcase 905 for storing, organizing, and retrieving virtual books 910, in accordance with an embodiment of the invention. Virtual bookcase 905 intuitively organizes virtual books 910 in a manner easily usable by less tech-savvy individuals who are not comfortable with hierarchical file structures (e.g., Windows Explorer or DOS based directory systems). Data, text, and/or images are accessible by opening one of virtual books 910. Virtual books 910 are stored on bookcases 905 and identified by their physical location within a particular bookcase 905 (i.e., bookshelf and position on bookshelf) and the visual distinctiveness of virtual books 910. Patterns, designs, and/or color schemes may be associated with each virtual book 910 or with groups of virtual books 910 containing related information to aid the user with identifying his/her desired virtual book 910.

In one embodiment, virtual bookcase 905 is accessed by clicking on the bookcase access element. In one embodiment, a user may alternately hide/display any one of multiple virtual bookcases 905 by clicking on a left tab region 915 of virtual bookcases 905. Again, virtual bookcase 905 and virtual books 910 may be rendered to display screen 900 with a hierarchical data structure. For example, back rendering layers may be associated with virtual bookcase 905, while front rendering layers may be associated with virtual books 910. A particular virtual book 910 may be opened by clicking on the spine or binding of the particular virtual book 910.

Verb s-machines may establish event pathways as the user moves screen pointer 350 over the book spines. The verb s-machines execute the tasks associated with opening a book upon registering a mouse click.

Figure 8:
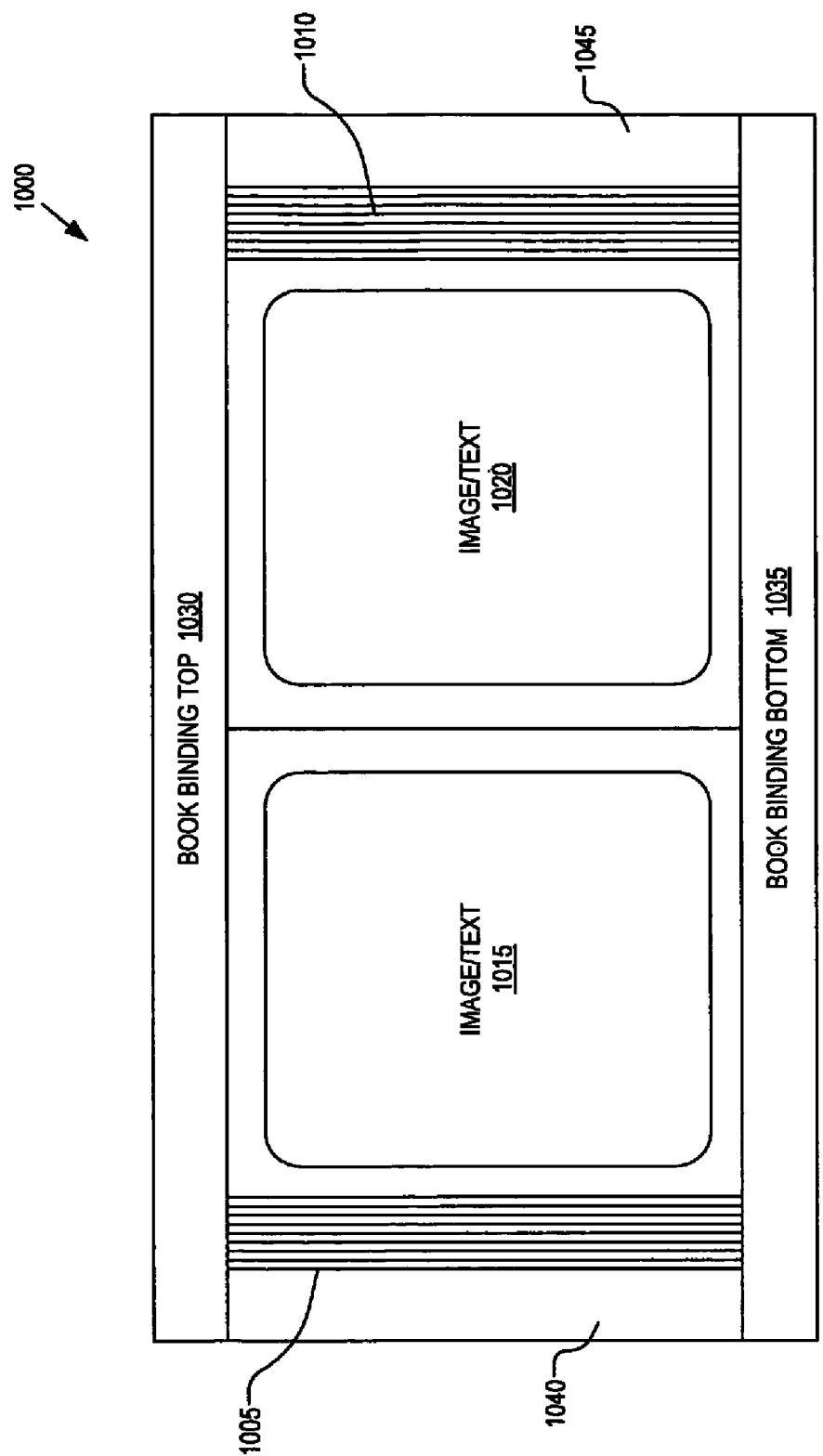
FIG. 8 is a block diagram illustrating an open virtual book, in accordance with an embodiment of the invention.

FIG. 8 is a block diagram illustrating an open virtual book 1000, in accordance with an embodiment of the invention. The illustrated embodiment of open virtual book 1000 includes a book binding, left page edges 1005, right page edges 1010, left image/text 1015, and right image/text 1020. The illustrated embodiment of the book binding includes exposed portions: a book binding top 1030, a book binding bottom 1035, a left side book binding 1040, and a right side book binding 1045. In one embodiment, the exposed portions of the book binding may have the same color scheme or pattern as the spine for easy recognition by a user.

Figure 9:
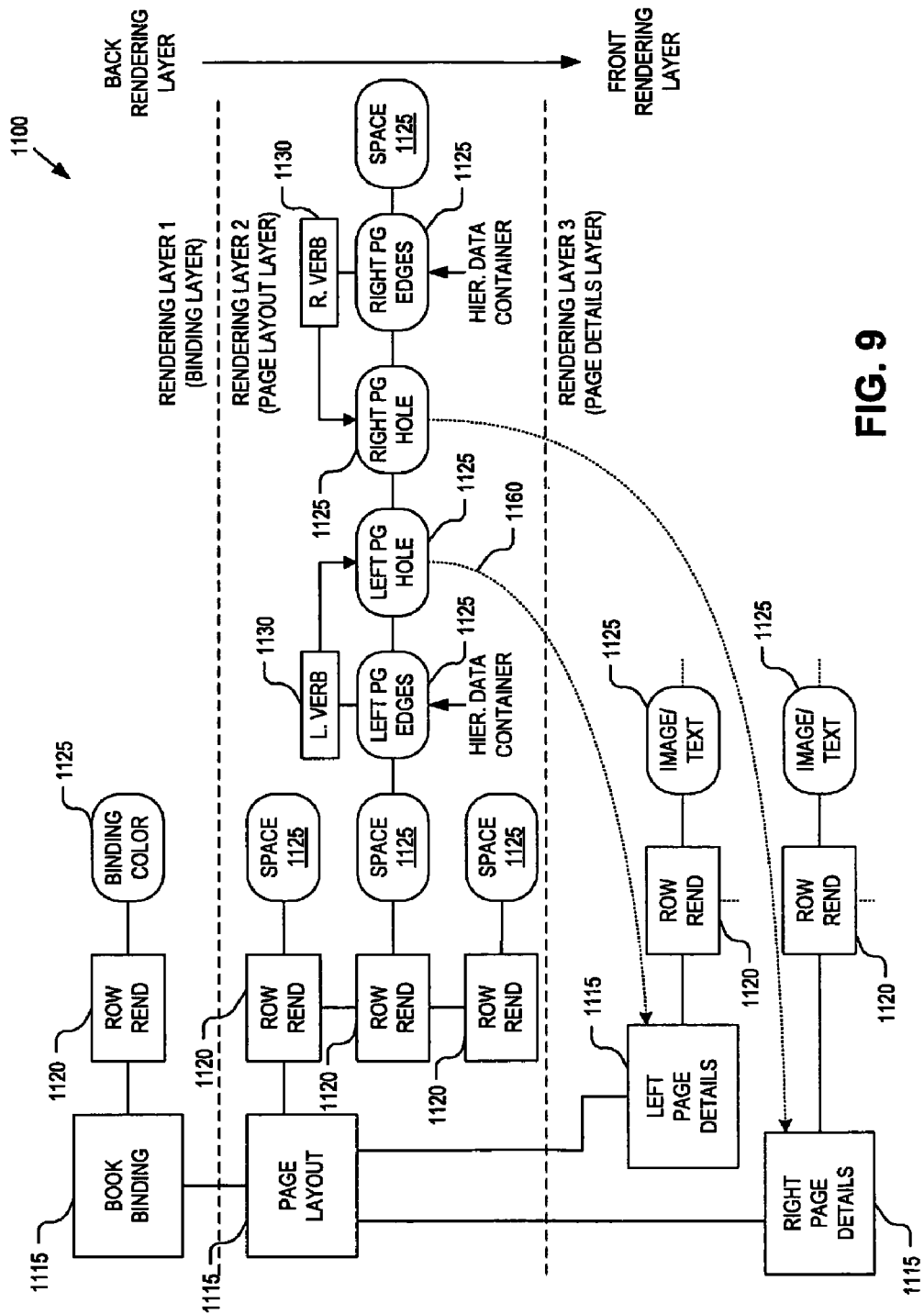
FIG. 9 is a block diagram illustrating a hierarchical data structure for rendering the open virtual book illustrated in FIG. 8, in accordance with an embodiment of the invention.

FIG. 9 is a block diagram illustrating a hierarchical data structure 1100 for rendering open virtual book 1000 illustrated in FIG. 8, in accordance with an embodiment of the invention. The illustrated embodiment of hierarchical data structure 1100 includes hierarchical grouping s-machines 1115, row rendering s-machines 1120, screen element s-machines 1125, and verb s-machines 1130.

The hierarchical grouping s-machine 1115 labeled "book binding" is associated with rendering the book binding at the back rendering layer. The screen element s-machine 1125 labeled "binding color" is responsible for determining the color, pattern, or scheme of book binding top 1030, book binding bottom 1035, left side book binding 1040, and right side book binding 1045.

The hierarchical grouping s-machine labeled "page layout" is associated with rendering the layout of open virtual book 1000 at the page layout rendering layer, which is rendered in front of the book binding rendering layer. The screen element s-machine 1125 labeled "left PG edges" is responsible for generating left page edges 1005 while the screen element s-machine 1125 labeled "right PG edges" is responsible for generating right page edges 1010 (note "PG" is an abbreviation used herein for "page"). The left PG hole s-machine and the right PG hole s-machine generate insertion gaps, which are subsequently rendered over with image/text 1015 and 1020 generated by screen element s-machines 1125 labeled "image/text".

The screen element s-machines 1125 labeled "left PG hole" and "right PG hole" bind to the hierarchical grouping s-machines 1115 labeled "left page details" and "right page details", respectively. When a user clicks on left page edges 1005, left verb s-machine 1130 establishes an event pathway with interface event s-machine 205, registers the click event, and turns the page. It does so by first removing (i.e., unbinding) left PG hole and right PG hole s-machines from the row. The breaking of row bonds of the left PG hole and right PG hole s-machines causes them to signal via bond 1160 to the left page details and right page details s-machines, respectively, to unbind from the page layout s-machine. Since row rendering s-machine 1120 and the image/text s-machine 1125 remain bound to the left page details s-machine, detaching the left page details s-machine from hierarchical data structure 1100 has the effect of also removing the attached row rendering s-machine 1120 and image/text s-machine 1125 from hierarchical data structure 1100. Similarly, the removal of the right page details s-machine removes the associated row and image/text s-machines.

Figure 10:
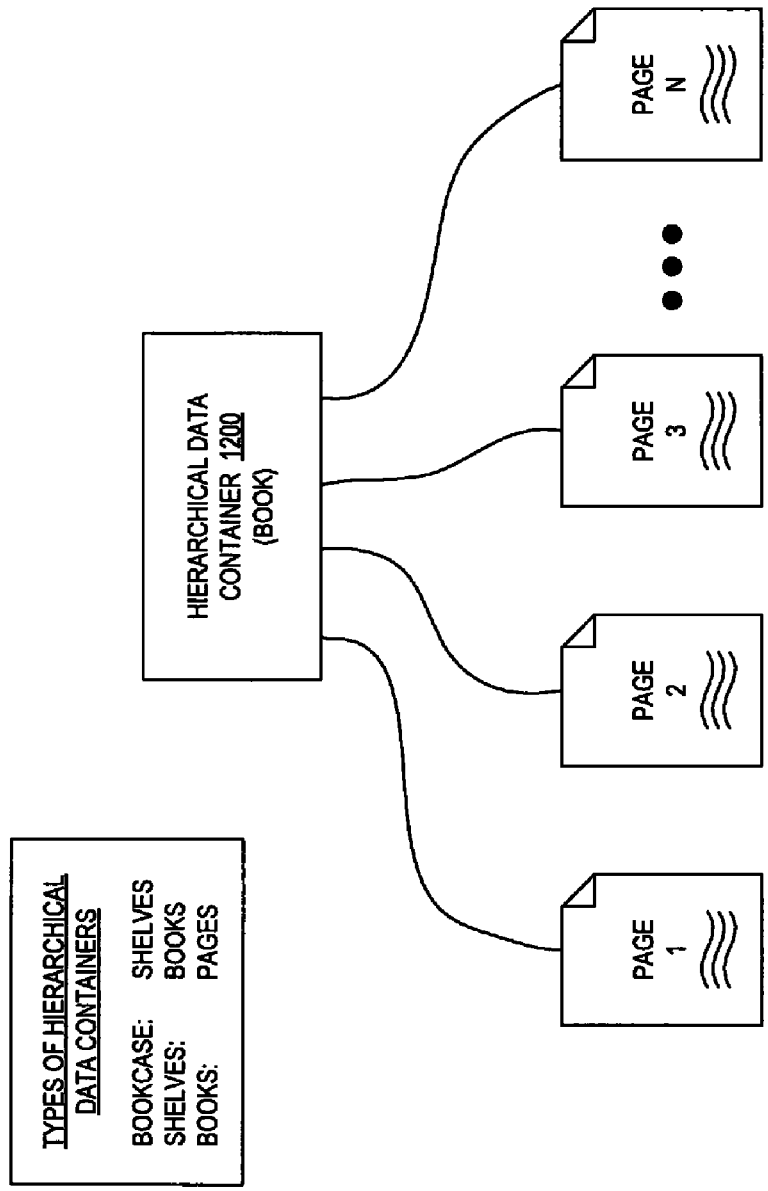
FIG. 10 is a block diagram illustrating a hierarchical data container for linking and organizing pages of a book, books on a shelf, or shelves of a bookcase, in accordance with an embodiment of the invention.

The left verb s-machine 1130 then locates left and right PG hole s-machines associated with the new left and right pages within hierarchical data container 1200 (see FIG. 10). Left verb s-machine 1130 then inserts the new left and right PG hole s-machines into the row between the left PG edges and right PG edges s-machines. The creation of row bonds causes the new PG hole s-machines to signal to their bound page details s-machines to expose binding sites to bind to the page layout s-machine. Thus the full data structure 1100 is restored, with new left and right pages.

It should be appreciated that page flipping may be accomplished a variety of different ways than attaching and detaching left PG hole and right PG hole s-machines. For example, the left page details or the right page details s-machines may be attached and detached instead, or the image/text s-machines may simply be attached and detached, as opposed to the entire branch starting with the left and right PG hole s-machines.

In one embodiment, as the user flips through the pages of open virtual book 1000, the appearance of left page edges 1005 and right page edges 1010 change to indicate the current page location within open virtual book 1000. For example, the thickness or number of vertical lines within left page edges 1005 and right page edges 1010 may vary.

In one embodiment, verb s-machines associated with screen elements of various parts of the virtual book can implement a single page turn or multiple page turns, dragging the virtual book around the screen, and closing the book (returning it to the bookshelf). For example, in one embodiment, if the user clicks in the middle of left page edges 1005, then open virtual book 1000 will flip to the middle pages. In one embodiment, if the user clicks on a left page margin (note, pages are rendered at the next rendering level of hierarchical data structure 1100 not illustrated in FIG. 9), then open virtual book 1000 will flip one page to the left. Correspondingly, if the user clicks on a right page margin, then open virtual book 1000 will flip one page to the right.

FIG. 10 is a block diagram illustrating a hierarchical data container 1200 for linking and organizing pages of a book, books on a shelf, or shelves of a bookcase, in accordance with an embodiment of the invention. Hierarchical data container 1200 groups hierarchical data in a meaningful manner so the data (e.g., pages of a virtual book) can be accessed in order. For example, hierarchical data structure 1200 links and organizes pages of a virtual book, virtual books on a bookshelf, bookshelves into bookcases, or the like. In the example of open virtual book 1000 and hierarchical data structure 1100, hierarchical data container 1200 may bind to the left PG edges s-machine and to the right PG edges s-machine to provide information as to the next page that should be rendered should the user click on left page edges 1005 or right page edges 1010.

Returning to FIG. 6, switching between independent desktop screens via clicking on screen access elements 805 may be implemented in a similar manner as described above in connection with flipping pages of open virtual book 1000. In other words, screen access elements 805 may be implemented with hierarchical data structures (e.g., hierarchical data structure 200 or hierarchical data structure 1100) to self-assemble data pathways, event pathways, and to connect and disconnect portions of the rendering hierarchy in a manner described above using verb s-machines. For example, clicking on one of the screen access elements could swap out the screen rendering hierarchy for another one. That is, it may disconnect everything bound below trigger machine 210 in FIG. 2, and replace it with a different hierarchy. In another embodiment, each independent desktop screen may be represented by an independent hierarchical data structure 200, each one within a different encapsulant, with trigger s-machine 210 on the surface. The sites bound to interface event s-machine 205 would be published on the outside of the encapsulant and the sites bound to hierarchical grouping s-machines published internal to the encapsulant. To swap between different desktop screens, interface event machine 205 would bind to a different encapsulant. Other techniques may be implemented.

Figure 11:
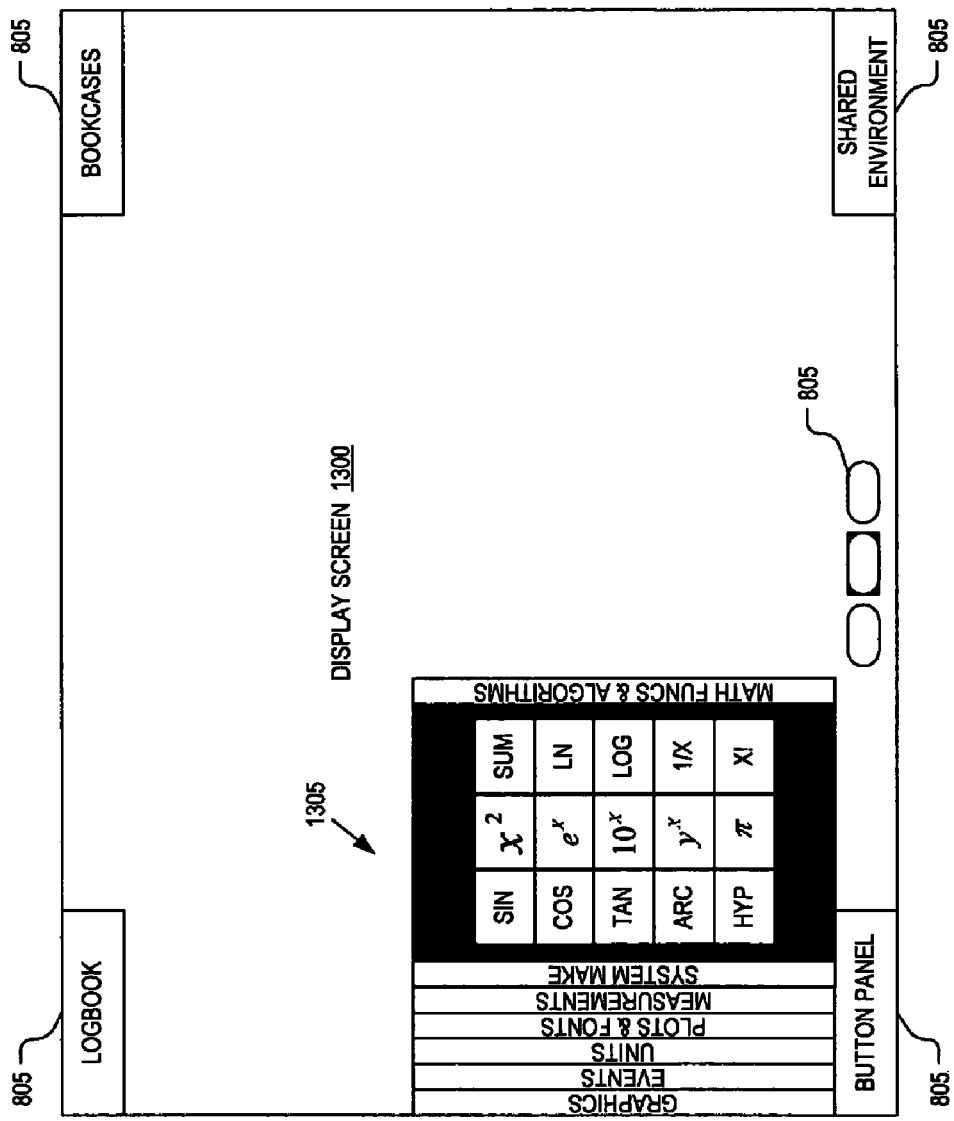
FIG. 11 is a block diagram illustrating a rendered display screen including an open button panel, in accordance with an embodiment of the invention.

FIG. 11 is a block diagram illustrating a display screen 1300 including an open button panel 1305, in accordance with an embodiment of the invention. Open button panel 1305 may be accessed by a user clicking on the button panel access element. In the illustrated embodiment, a math functions and algorithms button panel (or calculator) is open. In one embodiment, open button panel 1305 is rendered to display screen 1300 via a hierarchical data structure similar to hierarchical data structure 200. In one embodiment, verb s-machines capable of implementing various math functions may bind to screen element s-machines associated with each button of the illustrated calculator.

In one embodiment, buttons on a button panel 1305 may provide the functionality to create entirely new bookcases, books, button panels, or buttons. For example, a "make book" verb s-machine may respond to a left-mouse-click event on the rendering region of a make-book button screen element s-machine by generating all of the required s-machines, with appropriately complementary site binding keys, to automatically self-assemble the hierarchical data container book and pages (similar to FIG. 10) and open book hierarchical data structure 1100 (similar to FIG. 9). The further automatic self-assembly of the hierarchical data structure 1100 with the trigger machine 210 of FIG. 2 would result in the newly created book being rendered to the screen. Subsequent movement of the screen pointer 350 over the book would result in the self-assembly of verb pathways in the same manner as described above. Similarly, additional verb s-machines may be capable of generating all of the required s-machines, with appropriately complementary binding site keys to render and interact with bookcases, button panels, buttons, or other interface entities. It should be appreciated that display screens 800, 900, and 1300 and open virtual book 1000 may be rendered or generated using a variety of techniques including the s-machines described herein, object orientated programming techniques, or otherwise.

Figure 12:
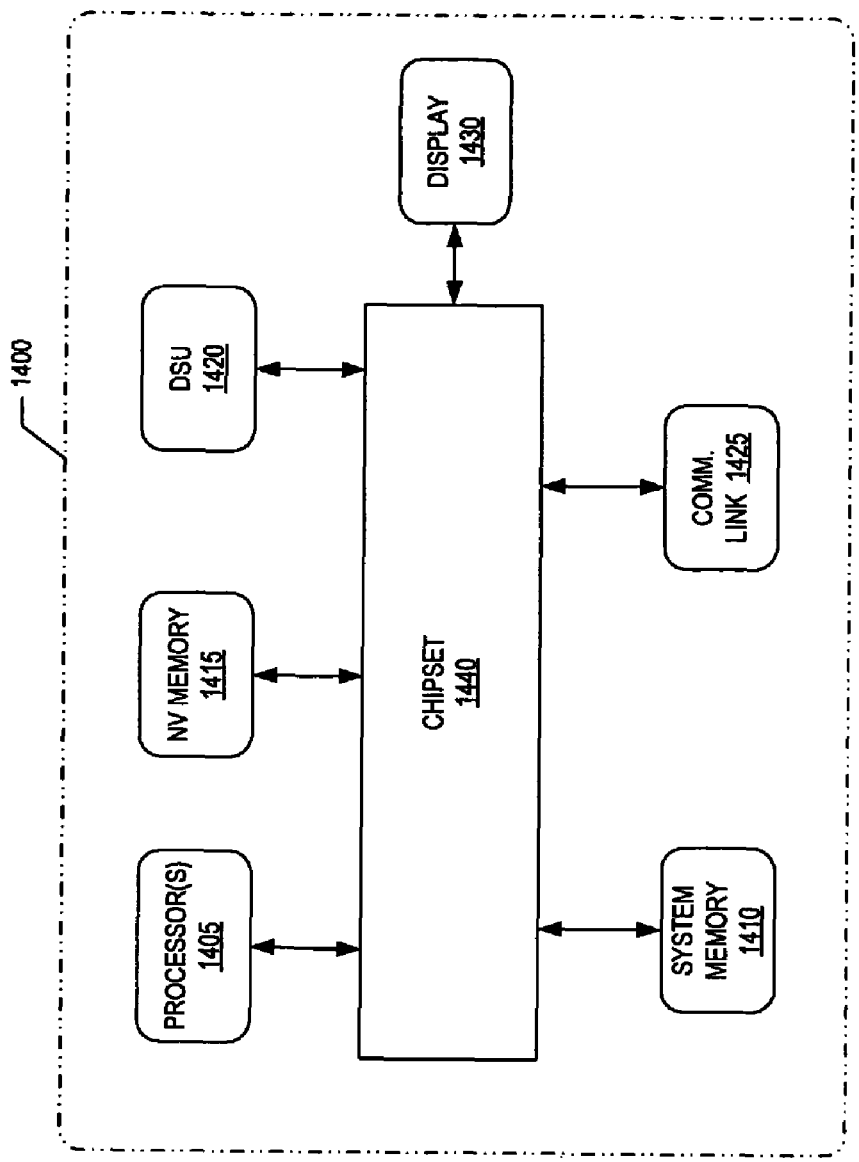
FIG. 12 is a block diagram illustrating a demonstrative processing system to implement embodiments of the invention thereon.

FIG. 12 is a block diagram illustrating a demonstrative processing system 1400 for executing embodiments of the invention described above. The illustrated embodiment of processing system 1400 includes one or more processors (or central processing units) 1405, system memory 1410, nonvolatile ("NV") memory 1415, a data storage unit ("DSU") 1420, a communication link 1425, a display 1430, and a chipset 1440. The illustrated processing system 1400 may represent any computing system including a desktop computer, a notebook computer, a workstation, a handheld computer, a server, a blade, or the like.

The elements of processing system 1400 are interconnected as follows. Processor(s) 1405 is communicatively coupled to system memory 1410, NV memory 1415, DSU 1420, and communication link 1425, via chipset 1440 to send and to receive instructions or data thereto/therefrom. In one embodiment, NV memory 1415 is a flash memory device. In other embodiments, NV memory 1415 includes any one of read only memory ("ROM"), programmable ROM, erasable programmable ROM, electrically erasable programmable ROM, or the like. In one embodiment, system memory 1410 includes random access memory ("RAM"), such as dynamic RAM ("DRAM"), synchronous DRAM ("SDRAM"), double data rate SDRAM ("DDR SDRAM"), static RAM ("SRAM"), or the like. DSU 1420 represents any storage device for software data, applications, and/or operating systems, but will most typically be a nonvolatile storage device. DSU 1420 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 1420 is illustrated as internal to processing system 1400, DSU 1420 may be externally coupled to processing system 1400. Communication link 1425 may couple processing system 1400 to a network such that processing system 1400 may communicate over the network with one or more other computers. Communication link 1425 may include a modem, an Ethernet card, a Gigabit Ethernet card, Universal Serial Bus ("USB") port, a wireless network interface card, a fiber optic interface, or the like. Display unit 1430 may be coupled to chipset 1440 via a graphics card and renders images (e.g., display screens 300, 800, 900, 1300) for viewing by a user.

It should be appreciated that various other elements of processing system 1400 may have been excluded from FIG. 12 and this discussion for the purposes of clarity. Chipset 14400 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 1440. Correspondingly, processing system 1400 may operate without one or more of the elements illustrated. For example, processing system 1400 need not include DSU 1420.

The processes explained above are described in terms of computer software and hardware. The techniques described may constitute computer-executable instructions embodied within a computer readable medium, that when executed by a computer will cause the computer to perform the operations described. Additionally, the processes may be embodied within hardware, such as an application specific integrated circuit ("ASIC") or the like.

A computer-accessible medium includes any mechanism that provides (i.e., stores and/or transmits) information in a form accessible by a physical machine (e.g., a computer, network device, personal digital assistant, manufacturing tool, any device with a set of one or more processors, etc.). For example, a computer-accessible medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method to generate a virtual environment, comprising:
    linking a first hierarchical software machine ("s-machine") to a second hierarchical s-machine to form a hierarchically arranged data structure, wherein the first hierarchical s-machine groups one or more first rendering s-machines for controlling rendering at a background rendering layer of a rendering region on a display screen and the second hierarchical s-machine groups one or more second rendering s-machines for controlling rendering at a foreground rendering layer of the rendering region overlaying at least a portion of the background rendering layer, wherein relative positions of the first and second hierarchical s-machines within the hierarchically arranged data structure correspond to the background rendering layer and the foreground rendering layer, respectively, on the display screen;
    linking a third s-machine to the first hierarchical s-machine, the third s-machine to manage data associated with a screen element to be rendered within the rendering region at the background rendering layer; and
    rendering the virtual environment including the screen element to the display screen,
    wherein the first and second hierarchical s-machines and the third s-machine comprise executables that each execute one or more commands to implement one or more tasks.

2. The method of claim 1, wherein the third s-machine comprises a screen element s-machine, the method further comprising:
    linking a fourth s-machine to the first hierarchical s-machine and the screen element s-machine between the first hierarchical s-machine and the screen element s-machine, the fourth s-machine associated with a sub-region at the background rendering layer within the rendering region, and wherein the screen element is rendered to a display screen within the sub-region at the background rendering layer.

3. The method of claim 2, wherein the sub-region comprises a first sub-region, the method further comprising:
    linking one or more additional s-machines from the fourth s-machine, the additional s-machines each associated with a corresponding additional sub-region at the background rendering layer within the rendering region; and
    linking one or more additional screen element s-machines to the screen element s-machine, the additional screen element s-machines each to manage data associated with additional screen elements rendered to the display screen within the first sub-region at the background rendering layer.

4. The method of claim 3, further comprising:
    linking one of the additional screen element s-machines to the second hierarchical s-machine to establish a bond for signaling to the second hierarchical s-machine when to disconnect from the first hierarchical s-machine.

5. The method of claim 4, wherein the rendering region includes a book binding of a virtual book, the first hierarchical s-machine comprises a page layout s-machine for grouping screen elements associated with the virtual book, and the second hierarchical s-machine comprises a left page details s-machine for grouping screen elements associated with a left page rendered within the virtual book.

6. The method of claim 5, wherein one of the additional screen element s-machines comprises a left page edges s-machine for rendering virtual left page edges and wherein another one of the additional screen element s-machines comprises a right page edges s-machine for rendering virtual right page edges.

7. The method of claim 6, further comprising:
    linking a verb s-machine to the left page edges s-machine;
    receiving, at the verb s-machine, a page turn event indicating a user clicked on the virtual left page edges rendered to the display screen;
    notifying the one of the additional screen element s-machines bound to the left page details s-machine of the page turn event; and
    disconnecting the left page details machine from the page layout machine.

8. The method of claim 7, further comprising:
    querying a hierarchical data container linking multiple virtual pages of the virtual book to determine a next page; and
    connecting a new left page details s-machine to the page layout machine.

9. The method of claim 2, wherein the first and second hierarchical s-machines each comprise a hierarchical grouping s-machine to group row s-machines on a single rendering layer, respectively, and wherein the fourth s-machine comprises a row rendering s-machine to render the screen element to the display screen based on the data managed by the screen element s-machine.

10. The method of claim 2, further comprising:
    signaling to the first hierarchical s-machine a location of a screen pointer on the display screen;
    signaling to the first hierarchical s-machine to determine whether the location of the screen pointer is coincident with a first region associated with the first hierarchical s-machine; and
    querying the fourth s-machine to determine whether the location of the screen pointer is coincident with the sub-region associated with the fourth s-machine.

11. The method of claim 10, further comprising:
    exposing a binding site on the screen element s-machine in response to the screen pointer residing over the screen element;
    linking a verb s-machine to the exposed binding site;
    linking the verb s-machine to an interface event s-machine; and
    polling at the interface event s-machine to determine whether a user event associated with the screen element has occurred, the verb s-machine to implement a function in response to the user event.

12. The method of claim 2, wherein the first and second hierarchical s-machines, the fourth s-machine, and the screen element s-machine comprise software entities that implement respective tasks and bind to each other by matching complementary binding keys.

13. The method of claim 1, further comprising:
executing an interface event s-machine to monitor for user input events for interacting with the virtual environment, wherein the first hierarchical s-machine links data pathways between the interface event s-machine and the first rendering s-machines,
wherein the second hierarchical s-machine links the data pathways between the interface event s-machine and the second rendering s-machines.

14. A non-transitory computer-accessible storage medium that provides instructions that, when executed by a computer, will cause the computer to perform operations comprising:
linking a first hierarchical software machine ("s-machine") to a second hierarchical s-machine forming a hierarchically arranged data structure, wherein the first hierarchical s-machine groups one or more first rendering s-machines at a background rendering layer of a rendering region and the second hierarchical s-machine groups one or more second rendering s-machines for controlling rendering at a foreground rendering layer of the rendering region overlaying at least a portion of the background rendering layer, wherein relative positions of the first and second hierarchical s-machines within the hierarchically arranged data structure correspond to the background rendering layer and the foreground rendering layer, respectively, on a display screen;
linking a screen element s-machine to the first hierarchical s-machine, the screen element s-machine to manage data associated with a screen element to be rendered within the rendering region at the background rendering layer; and
rendering the screen element to the display screen,
wherein the first and second hierarchical s-machines and the screen element s-machine comprise executables that each execute one or more commands to implement one or more tasks.

15. The non-transitory computer-accessible storage medium of claim 14, further providing instructions that, when executed by the computer, will cause the computer to perform further operations, comprising:
linking a fourth s-machine to the first hierarchical s-machine and the screen element s-machine between the first hierarchical s-machine and the screen element s-machine, the fourth s-machine associated with a sub-region at the background rendering layer within the rendering region, and wherein the screen element is rendered to the display screen within the sub-region at the background rendering layer.

16. The non-transitory computer-accessible storage medium of claim 15, wherein the sub-region comprises a first sub-region, the computer-accessible medium further providing instructions that, when executed by the computer, will cause the computer to perform further operations, comprising:
linking one or more additional s-machines from the fourth s-machine, the additional s-machines each associated with a corresponding additional sub-region at the background rendering layer within the rendering region; and
linking one or more additional screen element s-machines to the screen element s-machine, the additional screen element s-machines each to manage data associated with additional screen elements rendered to the display screen within the first sub-region at the background rendering layer.

17. The non-transitory computer-accessible storage medium of claim 16, further providing instructions that, when executed by the computer, will cause the computer to perform further operations, comprising:
linking one of the additional screen element s-machines to the second hierarchical s-machine to establish a link for signaling to the second hierarchical s-machine when to disconnect from the first hierarchical s-machine.

18. The non-transitory computer-accessible storage medium of claim 17, wherein the rendering region comprises a book binding of a virtual book, the first hierarchical s-machine comprises a page layout s-machine for grouping screen elements associated with the virtual book, and the second hierarchical s-machine comprises a left page details s-machine for grouping screen elements associated with a left page rendered within the virtual book.

19. The non-transitory computer-accessible storage medium of claim 18, wherein one of the additional screen element s-machines comprises a left page edges s-machine for rendering virtual left page edges and wherein another one of the additional screen element s-machines comprises a right page edges s-machine for rendering virtual right page edges.

20. The non-transitory computer-accessible storage medium of claim 19, further providing instructions that, when executed by the computer, will cause the computer to perform further operations, comprising:
linking a verb s-machine to the left page edges s-machine;
receiving, at the verb s-machine, a page turn event indicating a user clicked on the virtual left page edges rendered to the display screen;
signaling the one of the additional screen element s-machines bound to the left page details s-machine of the page turn event; and
disconnecting the left page details machine from the page layout s-machine.

21. The non-transitory computer-accessible storage medium of claim 15, further providing instructions that, when executed by the computer, will cause the computer to perform further operations, comprising:
signaling to the first hierarchical s-machine a location of a screen pointer on the display screen;
signaling to the first hierarchical s-machine to determine whether the location of the screen pointer is coincident with a first region associated with the first hierarchical s-machine; and
querying the fourth s-machine to determine whether the location of the screen pointer is coincident with the sub-region associated with the fourth s-machine.

22. The non-transitory computer-accessible storage medium of claim 21, further providing instructions that, when executed by the computer, will cause the computer to perform further operations, comprising:
exposing a binding site on the screen element s-machine in response to the screen pointer residing over the screen element;
linking a verb s-machine to the exposed binding site;
linking the verb s-machine to an interface event s-machine; and
polling at the interface event s-machine to determine whether a user event associated with the screen element has occurred, the verb s-machine to implement a function in response to the user event.

23. A system, comprising:

a processor; and a data storage unit coupled to the processor, the data storage unit storing instructions that, if executed by the processor, will cause the processor to perform operations including:

- linking a first hierarchical s-machine to a second hierarchical s-machine forming a hierarchically arranged data structure, wherein the first hierarchical s-machine groups one or more first rendering s-machines for controlling rendering at a background rendering layer of a rendering region and the second hierarchical s-machine groups one or more second rendering s-machines for controlling rendering at a foreground rendering layer of the rendering region overlaying at least a portion of the background rendering layer, wherein relative positions of the first and second hierarchical s-machines within the hierarchically arranged data structure correspond to the background rendering layer and the foreground rendering layer, respectively, on a display screen; and
- linking a screen element s-machine to the first hierarchical s-machine, the screen element s-machine to manage data associated with a screen element to be rendered within the rendering region at the background rendering layer,
- wherein the first and second hierarchical s-machines and the first and second rendering s-machines comprise executables that each execute one or more commands to implement one or more tasks.

24. The system of claim 23, wherein the data storage unit further stores instructions that, if executed by the processor, will cause the processor to perform further operations, comprising:

linking one or more additional screen element s-machines to the screen element s-machine, the additional screen element s-machines each to manage data associated with additional screen elements within the rendering region at the background rendering layer.

25. The system of claim 23, wherein the data storage unit further stores instructions that, if executed by the processor, will cause the processor to perform further operations, comprising:

communicating to the first hierarchical s-machine a location of a screen pointer on the display screen;

querying the first hierarchical s-machine to determine whether the location of the screen pointer is coincident with a first region associated with the first hierarchical s-machine; and querying the second hierarchical s-machine to determine whether the location of the screen pointer is coincident with a second region associated the second hierarchical s-machine.

26. The system of claim 25, wherein the data storage unit further stores instructions that, if executed by the processor, will cause the processor to perform further operations, comprising:

exposing a binding site on the screen element s-machine in response to the screen pointer residing over the screen element;

linking a verb s-machine to the exposed binding site;

linking the verb s-machine to an interface event s-machine; and polling at the interface event s-machine to determine whether a user event associated with the screen element has occurred, the verb s-machine to implement a function in response to the user event.

* * * * *